(12) United States Patent
Greer, IV

(10) Patent No.: US 6,334,016 B1
(45) Date of Patent: Dec. 25, 2001

(54) OPTICAL FIBER RIBBON MATRIX MATERIAL HAVING OPTIMAL HANDLING CHARACTERISTICS

(75) Inventor: Robert W. Greer, IV, Conover, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/345,382

(22) Filed: Jun. 30, 1999

(51) Int. Cl.[7] .................................................. G02B 6/44
(52) U.S. Cl. .............................................. 385/114; 385/147
(58) Field of Search ............................. 385/100–114, 147

(56) References Cited

U.S. PATENT DOCUMENTS

| | | | |
|---|---|---|---|
| 4,147,407 | 4/1979 | Eichenbaum et al. | 350/96.34 |
| 4,176,910 | 12/1979 | Noethe | 350/96.23 |
| 4,828,349 | 5/1989 | Nakasuji | 350/96.33 |
| 4,953,945 | * 9/1990 | Nishimura et al. | 385/100 |
| 5,062,685 | 11/1991 | Cain et al. | 350/96.23 |
| 5,082,347 | 1/1992 | Akasaka et al. | . |
| 5,245,134 | 9/1993 | Vana, Jr. et al. | 174/117 |
| 5,333,233 | 7/1994 | Mansfield et al. | 385/134 |
| 5,457,762 | 10/1995 | Lochkovic et al. | 385/114 |
| 5,524,164 | 6/1996 | Hattori et al. | 385/114 |
| 5,561,730 | 10/1996 | Lochkovic et al. | 385/114 |
| 5,600,750 | * 2/1997 | Beasley, Jr. et al. | 385/114 |
| 5,604,834 | 2/1997 | Beasley, Jr. et al. | 385/114 |
| 5,621,838 | 4/1997 | Nomura et al. | 385/100 |
| 5,675,686 | 10/1997 | Rosenmayer et al. | 385/114 |
| 5,761,363 | * 6/1998 | Mills | 385/114 |
| 5,809,195 | 9/1998 | Brown et al. | 385/114 |
| 5,933,559 | * 4/2000 | Petisce | 385/114 |
| 6,052,503 | 4/2000 | Schouten et al. | . |
| 6,054,217 | * 4/2000 | Szum et al. | 428/392 |

FOREIGN PATENT DOCUMENTS

| | | |
|---|---|---|
| 0 293 886 A2 | 12/1988 | (EP) . |
| WO98/10002 | 3/1998 | (WO) . |

* cited by examiner

Primary Examiner—Akm E. Ullah
(74) Attorney, Agent, or Firm—Sughrue Mion, PLLC

(57) ABSTRACT

An optical fiber ribbon including a matrix material and one or more optical fibers disposed therein. The properties of the matrix material have been developed so that the optical fiber ribbon has optimal handling characteristics such as superior heat strip, encapsulation, easy peel and breakout, good fiber geometry and robustness. The optical fiber ribbon achieves optimal handling characteristics by including in the matrix material a polymer having a glass transition temperature of greater than 100° C., an elongation to break of greater than 15% and a rheological behavior wherein the onset of non-Newtonian behavior occurs at a shear rate of greater than $10^3$ rad/sec.

13 Claims, 1 Drawing Sheet

OPTICAL FIBER RIBBON MATRIX MATERIAL HAVING OPTIMAL HANDLING CHARACTERISTICS

BACKGROUND OF THE INVENTION

1. Field of the Invention

The present invention relates to optical fiber ribbons including optical fibers and cables, and more particularly to optical fiber ribbons including one or more optical fibers disposed in a matrix material. Further, the present invention relates to optical fiber ribbons having well balanced ribbon properties desirable for handling optical fiber ribbons during production, splicing operations, and midspan access.

2. Related Art

Optical fiber ribbon is a type of optical fiber cable that has become quite popular for many uses. Unlike conventional loose tube optical cables wherein the 250 micrometer ($\mu$m) color-coded optical fibers are placed loosely inside a gel-filled plastic tube, optical fiber ribbons contain a matrix material which fixedly holds a plurality of optical fibers therein. Optical fiber ribbons normally incorporate 250 $\mu$m color-coded optical fibers—typically 2–24 optical fibers—which are held together in the form of a flat linear matrix by a suitable ultraviolet (UV) curable encapsulant matrix material. Although different materials can be utilized for the matrix material, the matrix material is most suitably formed from UV curable acrylate based resins which are well known in the fiber optic art. However, a matrix material including a variety of desired handling characteristics such as good heat strip, encapsulation, easy peel, breakout, good fiber geometry and robustness has remained unknown, even though, as discussed below, matrix materials having individual ones of the desirable handling characteristics have been developed. That is, because the properties of the matrix material often affect handling characteristics in different ways, it has been difficult to develop an optical fiber ribbon having optimal handling characteristics.

U.S. Pat. No. 5,761,363 to Mills (Mills) discloses an optical fiber ribbon which is heat strippable and peelable. Although Mills recognizes that adhesion between the matrix material and the optical fibers therein affects peelability, he does not recognize that the properties of the matrix material affect the heat strippability and peelability of the ribbon. Instead, Mills provides an interfacial layer disposed between the outermost layer on each individual optical fiber and the matrix material. In disposing an interfacial layer, Mills adds complexity and cost to the production of an optical fiber ribbon.

U.S. Pat. No. 4,953,945 to Nishimura et al. (Nishimura) discloses an optical fiber tape which allows easy handling in splicing operations and which also has resistance to lateral pressures, thereby reducing the transmission loss due to microbending of the optical fibers in the tape. However, similar to Mills, Nishimura introduces a peelable coating layer between the optical fibers and the matrix material in which they are disposed. Again, like Mills, this arrangement adds complexity and cost to the production of an optical fiber ribbon.

U.S. Pat. No. 5,600,750 to Beasley, Jr. et al. (Beasley) discloses a method for midspan entry of optical ribbon fiber. Beasley notes that the success of his midspan entry method is dependent on the properties of the matrix material used in the optical ribbon fiber. In particular, Beasley notes that the midspan access is dependent on the property of peel strength, or adhesion, between the matrix material and the optical fibers therein, and on the sheer strength of the matrix material. However, Beasley does not disclose a matrix material having the desired properties of good heat strip, encapsulation, good fiber geometry and robustness.

In sum, the related art does not provide—in an optical fiber ribbon—a matrix material which includes a variety of desired handling characteristics such as good heat strip, encapsulation, easy peel, breakout, good fiber (geometry and robustness. Further, the related art discussed above does not provide for even individual ones of the desired handling characteristics in an easy to manufacture and cost-effective manner.

SUMMARY OF THE INVENTION

One object of the present invention is to overcome the disadvantages of the related art. Another object is to provide an easy to manufacture, cost effective, optical fiber ribbon having well balanced ribbon properties desirable for handling optical fiber ribbons during production, splicing operations, and midspan access.

The present invention provides a ribbon matrix material having optimal handling characteristics such as good heat strip, encapsulation, easy peel, breakout, good fiber geometry and robustness. Further, the present invention provides optimal handling characteristics without adding complexity to the optical fiber ribbon because the handling characteristics are provided by balancing the properties of the matrix material itself. Therefore, complexity of the optical fiber ribbon is minimized.

More specifically, the present invention provides a balance between glass transition temperature ($T_g$), elongation to break, and rheological behavior of the matrix material which, in turn, gives optimal handling characteristics.

BRIEF DESCRIPTION OF THE DRAWINGS

The above and other objects and advantages of the present invention will become more apparent by describing in detail preferred embodiments thereof with reference to the accompanying drawings, wherein.

DETAILED DESCRIPTION OF THE INVENTION

Figure 1:
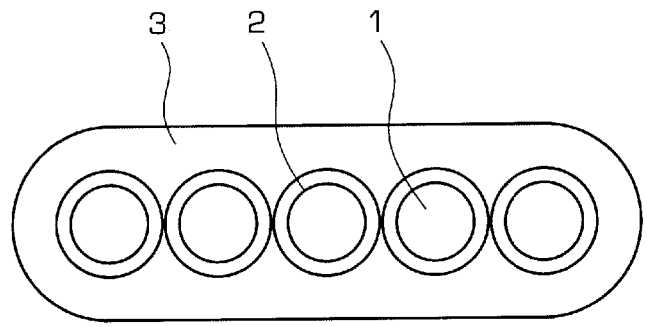
FIG. 1 is a schematic cross-sectional view of an optical fiber ribbon.

An optical fiber ribbon is shown generally in FIG. 1. The optical fiber ribbon includes one or more optical fibers 1, each of which includes a coating 2. The coating 2 may include a primary coating, a secondary coating, and a color layer. The optical fibers I are disposed in a matrix material 3. In an optical fiber ribbon, such as that shown in FIG. 1, handling characteristics such as good heat strip, encapsulation, easy peel, breakout, good fiber geometry and robustness are desirable. The inventor has developed an optical fiber ribbon matrix material which gives optimal handling characteristics.

In order to splice optical fibers of an optical fiber ribbon, it is usually necessary to remove not only the common matrix coatings, but also individual coatings from the optical fibers leaving only the optical fiber core and cladding, each of which may be formed of glass. Heat stripping equipment is often used to remove coatings prior to splicing. Because heat strippers may be set to various stripping temperatures, typically between 80 and 130° C., the optical fiber ribbon must have good heat strip over a range of temperatures. Various tests are used throughout the optical fiber industry to define good heat strip. As used herein, good heat strip includes a minimally deformed carcass with no observable significant residue in the heat strip tool. The carcass is the unit which is removed from the optical fiber ribbon by the heat strip tool, and should include as one unit the matrix material, as well as primary, secondary and color coatings of the optical fibers within the optical fiber ribbon.

Encapsulation is the maintenance of the ribbon matrix integrity when the optical fiber ribbon is subject to twisting. That is, an optical fiber ribbon has an acceptable encapsulation if the matrix material does not break apart, but instead separates from and forms a tube or envelope around the optical fibers disposed therein, when an optical fiber ribbon section is pinched on its ends and twisted. Alternatively, if the matrix material does break apart, or crack when the optical fiber ribbon is pinched on it ends and twisted, then the ribbon does not have an acceptable encapsulation.

Peel is removal of the matrix material from the optical fiber, including its coatings, at a point between the ends of the optical fiber ribbon. Peel is performed to achieve mid-span access to the optical fibers within the optical fiber ribbon. Thus, peel is the separation of the matrix material from the coatings of the optical fibers, i.e., removal of the matrix material from the optical fiber ribbon while leaving the optical fibers intact with their coatings, including color coating. It is desirable to be able to peel the common matrix material from the outer coatings on the individual optical fibers without damage to the optical fiber coatings. The separate optical fibers may then be identified and attached to different connectors or may be routed to different locations in a network. The toughness of the matrix material as well as the degree of its adhesion to the coated optical fibers are factors determining peel.

Breakout is similar to peel, but occurs at the end of the optical fiber ribbon. Breakout is defined as the removal of the matrix material, at an end of the optical fiber ribbon, from the optical fibers therein. That is, breakout is done when performing a splicing operation at the end of the optical fiber ribbon.

Both peel and breakout are pass/fail type tests. When tested, either the matrix material will separate from the optical fibers, leaving the coatings intact, or it will not. Further, peel and breakout are tests readily recognized in the optical fiber industry.

Good optical fiber ribbon geometry is defined and well known in the industry. The optical fiber ribbon geometry is determined by evaluating factors such as the thickness of the matrix along the edge fibers, flatness of the ribbon, alignment of the fibers within the matrix, and any minimum spots or maximum spots measured relative to the plane of the fibers. Ribbon geometry is typically measured by taking a cross section of the ribbon and measuring these dimensions via optical microscopy.

Robustness can be related to the resistance of the ribbon to twisting and crushing forces. That is, the robustness is the ability of the optical fiber ribbon to maintain its integrity in the face of twisting and lateral edge-to-edge crushing forces. Good ribbon geometry can produce good robustness, for example, a ribbon with an edge fiber exposed—due to not being coated with matrix material—would easily "pop out" when the ribbon is twisted. Additionally, a ribbon with a low spot in the middle of the ribbon which exposed a fiber would easily crush when compressed laterally. A ribbon with a large bow in it would also be easy to compress laterally and not be considered robust. Good robustness can also be produced by tailoring the interfacial adhesion between the matrix and ink/secondary coating layers. By maximizing this interfacial adhesion value —while considering acceptable peel and breakout to provide upper limits on this value—one can maximize robustness for a consistent ribbon geometry. Finally, if the matrix material is exceptionally brittle —having low toughness or elongation to break—the ribbon will crush easily and, therefore, not be considered robust.

As recognized by the present invention, the above properties can be largely affected by the optical fiber ribbon's matrix material itself.

The ability of the optical fiber ribbon to be heat stripped is affected by the glass transition temperature ($T_g$) of the matrix material. Throughout the specification, $T_g$ is defined as the peak of Tan δ during a dynamic thermomechanical test at a frequency of 62.8 rad/sec and an amplitude defined as within the linear viscoelastic region of the material as determined by a strain rate sweep of the material prior to testing.

Specifically, the inventor has found that when a heat stripper was set at 110° C., a temperature commonly used in the art, an optical fiber ribbon matrix polymer having a $T_g$ of greater than 100° C. gave acceptable heat strip. Further, the inventor has found that a polymer having a $T_g$ of greater than 105° C. gave superior heat strip, again, when the heat stripper was set at 110° C. Further, a polymer having a $T_g$ of 117° C. also gave superior heat strip. The inventor also found that many commercially available ribbon matrix materials have $T_g$'s at 60° or below. None of these materials gave acceptable heat strip for peelable optical fiber ribbon. While some matrix materials did have $T_g$'s above 90° C., they were not tough enough —did not have high enough elongation at break—and broke up leaving residue in the heat strip tool. It was therefore discovered that a combination of high $T_g$, and good toughness/elongation at break was required for acceptable heat strip for peelable optical fiber ribbon.

The inventor has found that encapsulation is affected by the elongation to break—or toughness—of the matrix material. When a polymer having an elongation to break of less than 15% was used for the matrix material of an optical fiber ribbon, failure in encapsulation resulted. When a polymer having an elongation to break of greater than 20% was used for the matrix material an acceptable encapsulation resulted.

Peel and breakout are affected by the adhesion between the matrix material and the coatings on the optical fibers therein. For a ribbon to peel successfully, there needs to be sufficient toughness of the matrix material so that during peel, the matrix material does not easily break which would result in an incomplete peel. Breakout is similar in that if the matrix easily crumbles, excessive residue can result; it is more convenient for the matrix to remain intact during breakout. Thus, the inventor has found that when a matrix material having an elongation to break greater than 20% was used, acceptable peel and breakout resulted.

Figure 2:
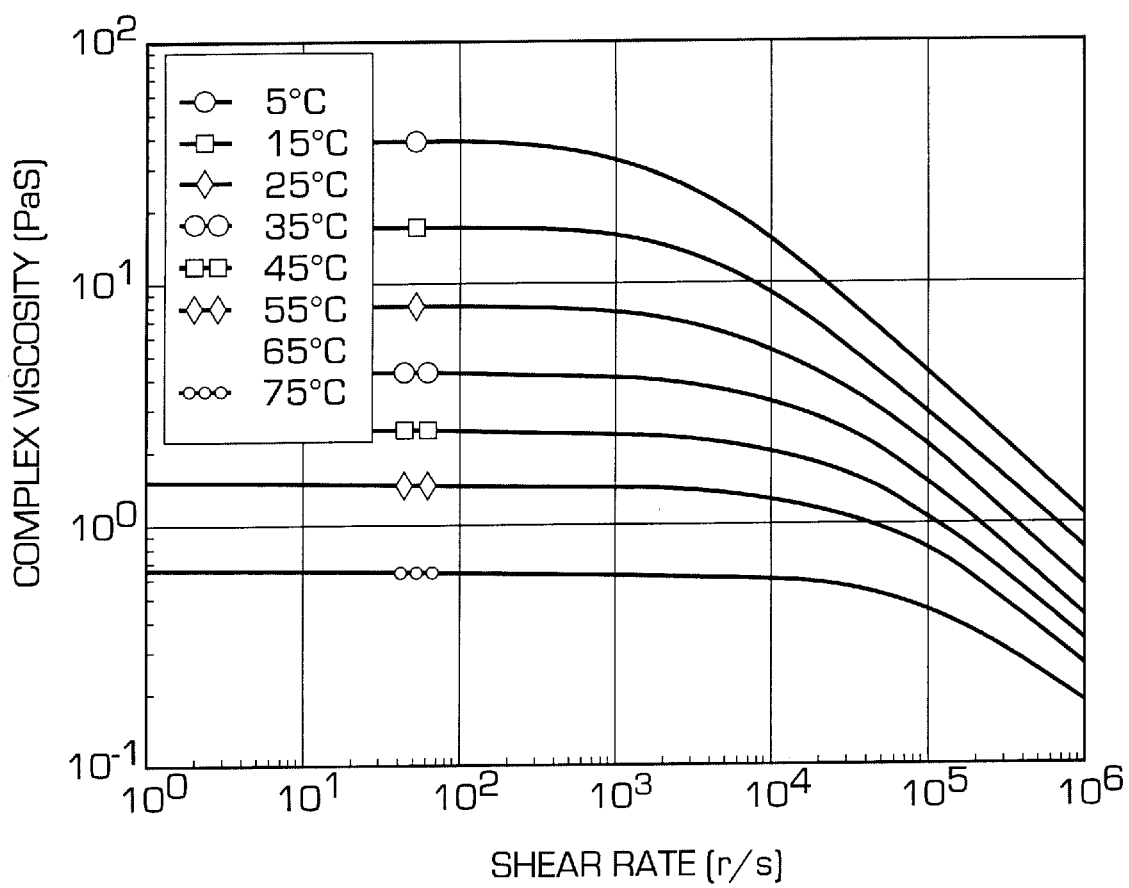
FIG. 2 is a graph showing the affect of temperature on rheological behavior for the matrix material of the present invention.

Fiber geometry can be affected by the rheological behavior of the matrix material. Throughout the specification, the values for Theological behavior are defined at 25° C. Heating the matrix material of the present invention can shift the onset of non-Newtonian behavior to higher shear rates. See FIG. 2, wherein at higher temperatures the matrix material becomes less viscous, and the onset of non-Newtonian behavior occurs at a higher shear rate. A matrix material which starts to shear thin below $10^3$ rad/sec does not provide good ribbon geometry, while those that shear thin above $10^3$ rad/sec do provide good ribbon geometry for typical line speeds and die designs used in the art.

The robustness of an optical fiber ribbon is affected by the adhesion between the matrix material and the coatings on the optical fibers therein. Further, the robustness is affected by the fiber geometry and, therefore, indirectly by the rheological behavior of the matrix material. Further, robustness is affected by the elongation to break of the matrix material. Thus, the inventor has found that when a material having onset of non-Newtonian behavior occurring at a shear rate greater than $10^3$ rad/sec, and having an elongation to break of greater than 20%, was used, good ribbon robustness resulted. Because of the good robustness, line speed can be increased during production of the optical fiber ribbon.

The inventor has developed an optical fiber ribbon matrix material having an optimal balance of $T_g$, elongation to break, and rheological properties, which results in superior heat strip, encapsulation, acceptable peel and breakout, a good fiber geometry and robustness which allows high line speed, i.e., one which results in optimal handling characteristics. A good balance of the handling characteristics results from using, for the matrix material, a polymer having a $T_g$ of greater than 100° C., and an elongation to break of greater than 15%. Further, a good balance of handling characteristics still results when the rheological behavior of the material was set so that the onset of non-Newtonian behavior occurred above $10^3$ rad/sec. An even better balance of handling characteristics results when a $T_g$ of 105° C. is used, with the elongation to break and rheological properties being the same although alternatively, the elongation to break may be greater than 20%. Further, an optimal balance of handling characteristics results when a $T_g$ of 117° C. is used, with the elongation to break and rheological properties being the same as above. The polymer of the matrix material is a radiation curable material, for example a UV curable material, a heat curable material, or an electron-beam curable material. Further, the matrix material of the present invention was found to readily accept pigments or dyes, thereby allowing different optical fiber ribbons to be identified.

More specifically, the matrix material itself can be composed of an oligomer, reactive diluent, and photoinitiator, as well as other additives such as release agents, adhesion promoters, and colorants such as pigments and/or dyes. The oligomer is typically an acrylated urethane oligomer, which is a reaction product of a hydrocarbon polyol, an aliphatic polyisocyanate and an endcapping monomer such as a hydroxyalkylacrylate or a hydroxyalkylmethacrylate. A general discussion of radiation curable fiber optic compositions may be found in U.S. Pat. No. 5,146,531 which is incorporated herein by reference. Through utilizing oligomers with stiffer backbone chemistry (for example, aromatic urethane acrylate oligomers), combined with higher functionality reactive diluents (such as trimethylolpropane triacrylate or 1,6 hexanediol diacrylate) one may optimize the rheological properties, $T_g$, and elongation to break to produce the desired material.

The above matrix materials are usable in an optical fiber ribbon having any number of optical fibers disposed therein. Further, although an optical fiber ribbon is shown, the matrix material of the present invention may be used for other shaped fiber optic cables. Further, although a single encapsulation matrix is shown, the present invention may also be used in a dual encapsulation matrix.

Although specific embodiments of the invention have been described above, it is contemplated that numerous modifications may be made to the optical fiber ribbon of the present invention without departing from the spirit and scope of the invention as defined in the following claims.

I claim:

1. An optical fiber ribbon matrix material comprising: a polymer having;

a $T_g$ of greater than 100° C.;

an elongation to break greater than 15%; and rheological behavior wherein the onset of non-Newtonian behavior occurs at greater than $10^3$ rad/sec at room temperature.

2. The optical fiber ribbon matrix material as set forth in claim 1, wherein said polymer has a $T_g$ of greater than 105° C.

3. The optical fiber ribbon matrix material as set forth in claim 1, wherein said polymer has a $T_g$ of 117° C.

4. The optical fiber ribbon matrix material as set forth in claim 1, wherein said polymer is a radiation curable polymer.

5. The optical fiber ribbon matrix as set forth in claim 1, wherein said polymer further includes a pigment or dye therein.

6. The optical fiber ribbon matrix as set forth in claim 1, wherein said polymer has an elongation to break greater than 20%.

7. An optical fiber ribbon comprising one or more optical fibers disposed in a matrix material, wherein the matrix material comprises a polymer having a $T_g$ of greater than 100° C., and an elongation to break of greater than 15%.

8. The optical fiber ribbon as set forth in claim 7, wherein said polymer has a $T_g$ of greater than 105° C.

9. The optical fiber ribbon as set forth in claim 7, wherein said polymer has a $T_g$ of 117° C.

10. The optical fiber ribbon as set forth in claim 7, wherein said polymer has rheological behavior such that the onset of non-Newtonian behavior occurs at greater than $10^3$ rad/sec at room temperature.

11. The optical fiber ribbon as set forth in claim 7, wherein said polymer is a radiation curable polymer.

12. The optical fiber ribbon as set forth in claim 7, wherein said polymer further includes a pigment or dye therein.

13. The optical fiber ribbon as set forth in claim 7, wherein said polymer has an elongation to break of greater than 20%.

* * * * *